United States Patent
Butterworth

(10) Patent No.: US 7,343,049 B2
(45) Date of Patent: Mar. 11, 2008

(54) METHOD AND APPARATUS FOR PERFORMING OPTICAL CHARACTER RECOGNITION (OCR) AND TEXT STITCHING

(75) Inventor: Mark Melvin Butterworth, Santa Clara, CA (US)

(73) Assignee: Marvell International Technology Ltd. (BM)

( * ) Notice: Subject to any disclaimer, the term of this patent is extended or adjusted under 35 U.S.C. 154(b) by 754 days.

(21) Appl. No.: 10/092,772

(22) Filed: Mar. 7, 2002

(65) Prior Publication Data

US 2003/0169923 A1    Sep. 11, 2003

(51) Int. Cl.
*G06K 9/36* (2006.01)

(52) U.S. Cl. ............. 382/284; 345/629; 345/634

(58) Field of Classification Search ........... 382/284
See application file for complete search history.

(56) References Cited

U.S. PATENT DOCUMENTS

| | | | | |
|---|---|---|---|---|
| 5,611,033 A | * | 3/1997 | Pitteloud et al. ............ | 345/629 |
| 5,657,402 A | * | 8/1997 | Bender et al. .............. | 382/284 |
| 5,675,672 A | * | 10/1997 | Nakabayashi ............... | 382/318 |
| 5,729,008 A | * | 3/1998 | Blalock et al. .......... | 250/208.1 |
| 5,909,521 A | * | 6/1999 | Nakao et al. ............... | 382/312 |
| 6,243,503 B1 | * | 6/2001 | Teufel et al. ............... | 382/312 |
| 6,259,826 B1 | * | 7/2001 | Pollard et al. .............. | 382/284 |
| 6,304,313 B1 | * | 10/2001 | Honma ........................ | 355/18 |
| 6,459,819 B1 | * | 10/2002 | Nakao ......................... | 382/284 |
| 7,043,745 B2 | * | 5/2006 | Nygren et al. ................. | 725/9 |
| 7,194,144 B1 | * | 3/2007 | Sakai et al. ................. | 382/284 |
| 2001/0030693 A1 | * | 10/2001 | Fisher et al. ................ | 348/218 |
| 2001/0055121 A1 | * | 12/2001 | Omura et al. ................ | 358/1.9 |
| 2002/0057848 A1 | * | 5/2002 | Tan et al. .................... | 382/284 |
| 2002/0094133 A1 | * | 7/2002 | Andreasson et al. ........ | 382/284 |
| 2002/0163530 A1 | * | 11/2002 | Takakura et al. ........... | 345/629 |

FOREIGN PATENT DOCUMENTS

JP    2000278514 A    * 10/2000

* cited by examiner

*Primary Examiner*—Matthew C. Bella
*Assistant Examiner*—Sath V. Perungavoor

(57) ABSTRACT

A method of generating an electronic text file from a paper-based document that includes a plurality of characters includes capturing a plurality of partially overlapping digital images of the document. Optical character recognition is performed on each one of the plurality of captured digital images, thereby generating a corresponding plurality of electronic text files. Each one of the electronic text files includes a portion of the plurality of characters in the document. The plurality of electronic text files are compared with one another to identify characters that are in common between the electronic text files. The plurality of electronic text files are combined into a combined text file based on the comparison. The combined text file includes the plurality of characters in the document.

13 Claims, 7 Drawing Sheets

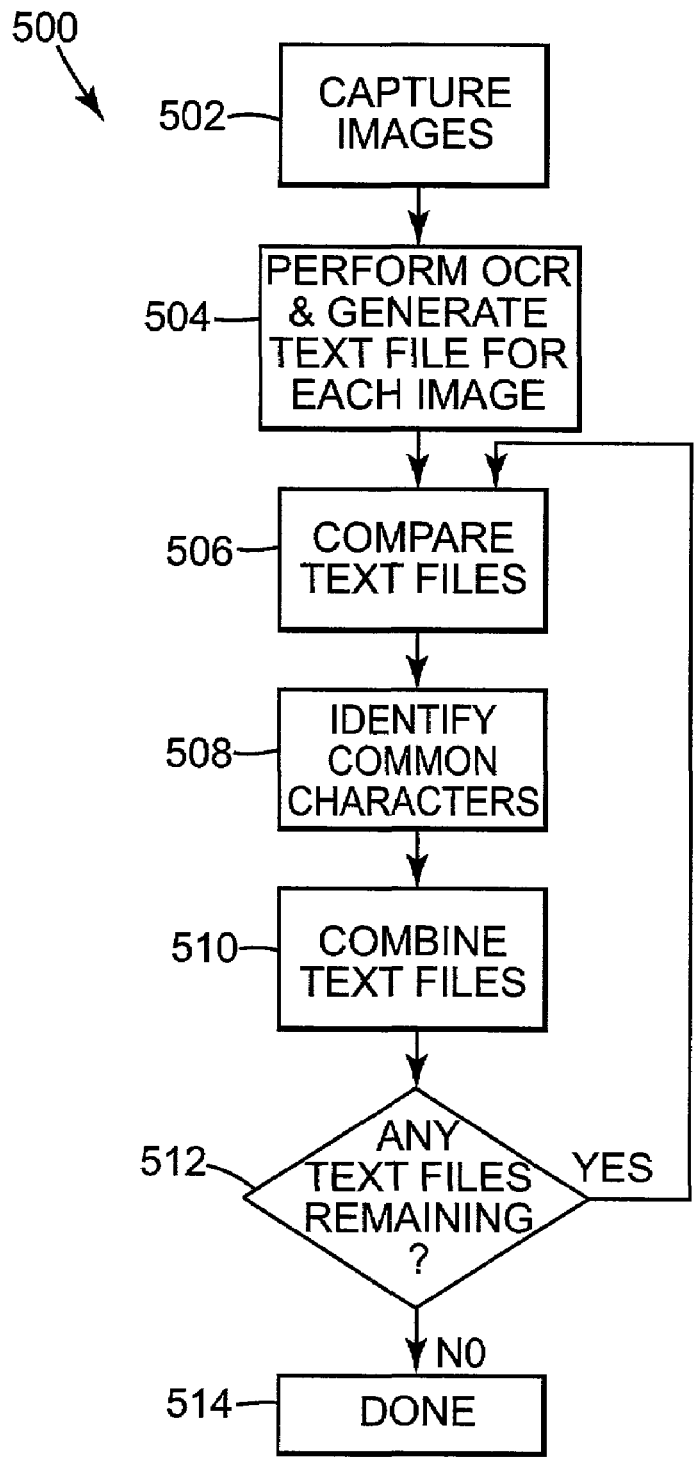

METHOD AND APPARATUS FOR PERFORMING OPTICAL CHARACTER RECOGNITION (OCR) AND TEXT STITCHING

THE FIELD OF THE INVENTION

This invention relates generally to optical character recognition (OCR). This invention relates more particularly to a method and apparatus for performing optical character recognition and text stitching.

BACKGROUND OF THE INVENTION

Many electronic devices, such as cellular telephones and personal digital assistants (PDAs), have the need for a digital camera to be included in the design. Such combined devices have been manufactured. The digital cameras for such combined devices are designed for general photography use. These cameras can also be used to capture images of printed text, such as the text on business cards. If OCR is performed on a digital image of text, a text file may be generated.

OCR requires high definition images. For some documents, several hundred thousand pixels or more may be required to obtain the desired recognition accuracy. However, some digital cameras, such as some digital cameras for cell phones, may only have a small number of pixels (e.g., 352×288). In such limited-pixel systems, only a small portion of a document can be imaged at a high enough resolution for OCR. Multiple images of a document can be "stitched" together to create a larger image with more pixels. Then, OCR can be performed on the larger image. But it is computationally intensive to perform such image stitching, and the lens distortion of multiple images makes stitching very difficult, if not impossible, in some cases.

It would be desirable to provide a more accurate and less computationally intensive system and method for converting digital images of a document into an electronic text file.

SUMMARY OF THE INVENTION

One form of the present invention provides a method of generating an electronic text file from a paper-based document that includes a plurality of characters. A plurality of partially overlapping digital images of the document are captured. Optical character recognition is performed on each one of the plurality of captured digital images, thereby generating a corresponding plurality of electronic text files. Each one of the electronic text files includes a portion of the plurality of characters in the document. The plurality of electronic text files are compared with one another to identify characters that are in common between the electronic text files. The plurality of electronic text files are combined into a combined text file based on the comparison. The combined text file includes the plurality of characters in the document.

BRIEF DESCRIPTION OF THE DRAWINGS

FIG. 5 is a flow diagram illustrating an OCR and text stitching algorithm according to one embodiment of the present invention.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
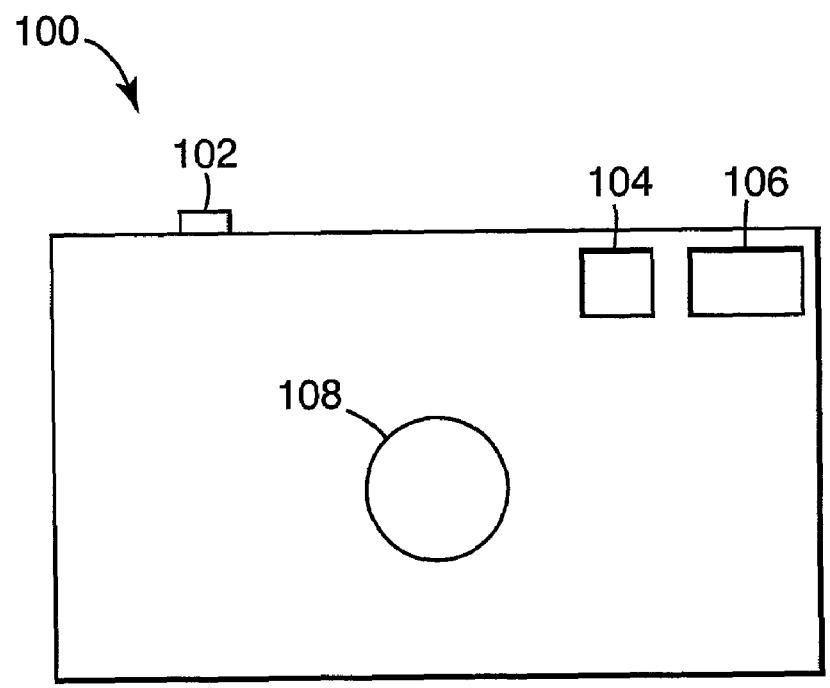
FIG. 1A is a diagram illustrating a simplified front view of a prior art digital camera.
Figure 1B:
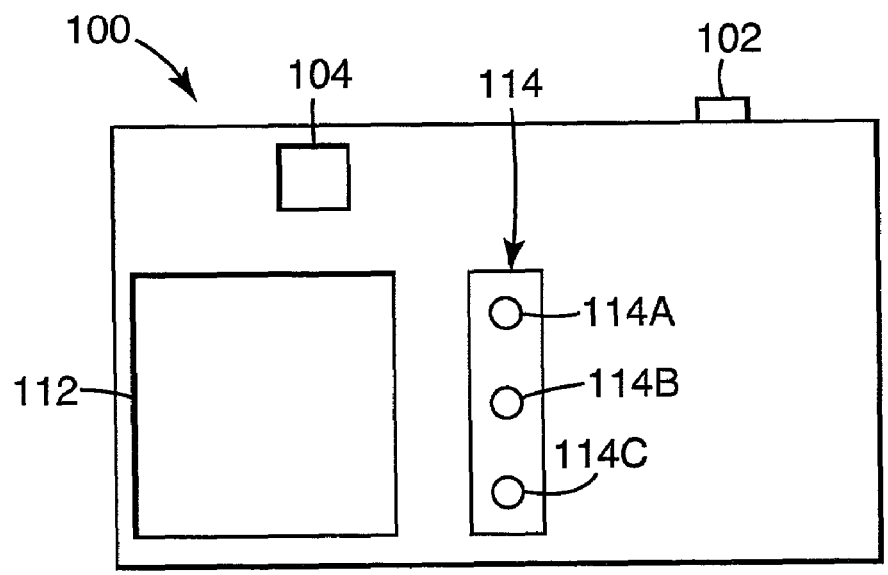
FIG. 1B is a diagram illustrating a simplified rear view of the digital camera shown in FIG. 1A.

FIG. 1A is a diagram illustrating a simplified front view of a prior art digital camera 100. FIG. 1B is a diagram illustrating a simplified rear view of the digital camera 100 shown in FIG. 1A. As shown in FIGS. 1A and 1B, camera 100 includes shutter button 102, optical viewfinder 104, flash 106, lens 108, liquid crystal display (LCD) 112, and user input device 114. User input device 114 includes buttons 114A-114C. User input device 114 allows a user to enter data and select various camera options.

In operation, a user looks through optical viewfinder 104 or at LCD 112 and positions camera 100 to capture a desired image. When camera 100 is in position, the user presses shutter button 102 to capture the desired image. An optical image is focused by lens 108 onto image sensor 200 (shown in FIG. 2), which generates pixel data that is representative of the optical image. Captured images are displayed on display 112. Flash 106 is used to illuminate an area to capture images in low-light conditions.

Figure 2:
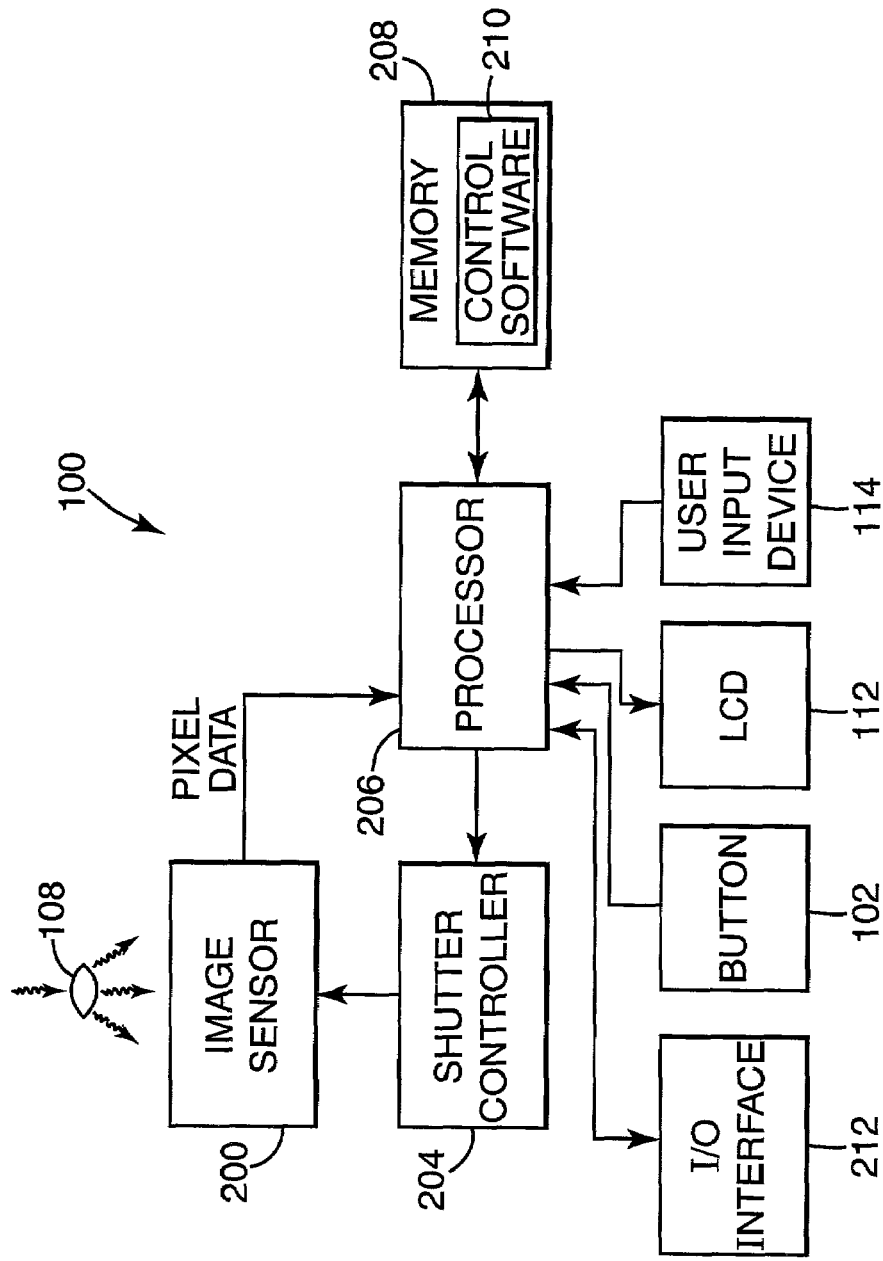
FIG. 2 is a block diagram illustrating major components of the digital camera shown in FIGS. 1A and 1B.

FIG. 2 is a block diagram illustrating major components of digital camera 100. Camera 100 includes lens 108, image sensor 200, shutter controller 204, processor 206, memory 208, input/output (I/O) interface 212, shutter button 102, LCD 112, and user input device 114. In one embodiment, memory 208 includes some type of random access memory (RAM) and non-volatile memory, but can include any known type of memory storage. Control software 210 for controlling processor 206 is stored in memory 208. In operation, when a user presses shutter button 102, processor 206 and shutter controller 204 cause image sensor 200 to capture an image. Image sensor 200 then outputs pixel data representative of the image to processor 206. The pixel data is stored in memory 208, and captured images may be displayed on LCD 112.

I/O interface 212 is configured to be coupled to a computer or other appropriate electronic device (e.g., a personal digital assistant), for transferring information between the electronic device and camera 100, including downloading captured images from camera 100 to the electronic device.

Figure 3:
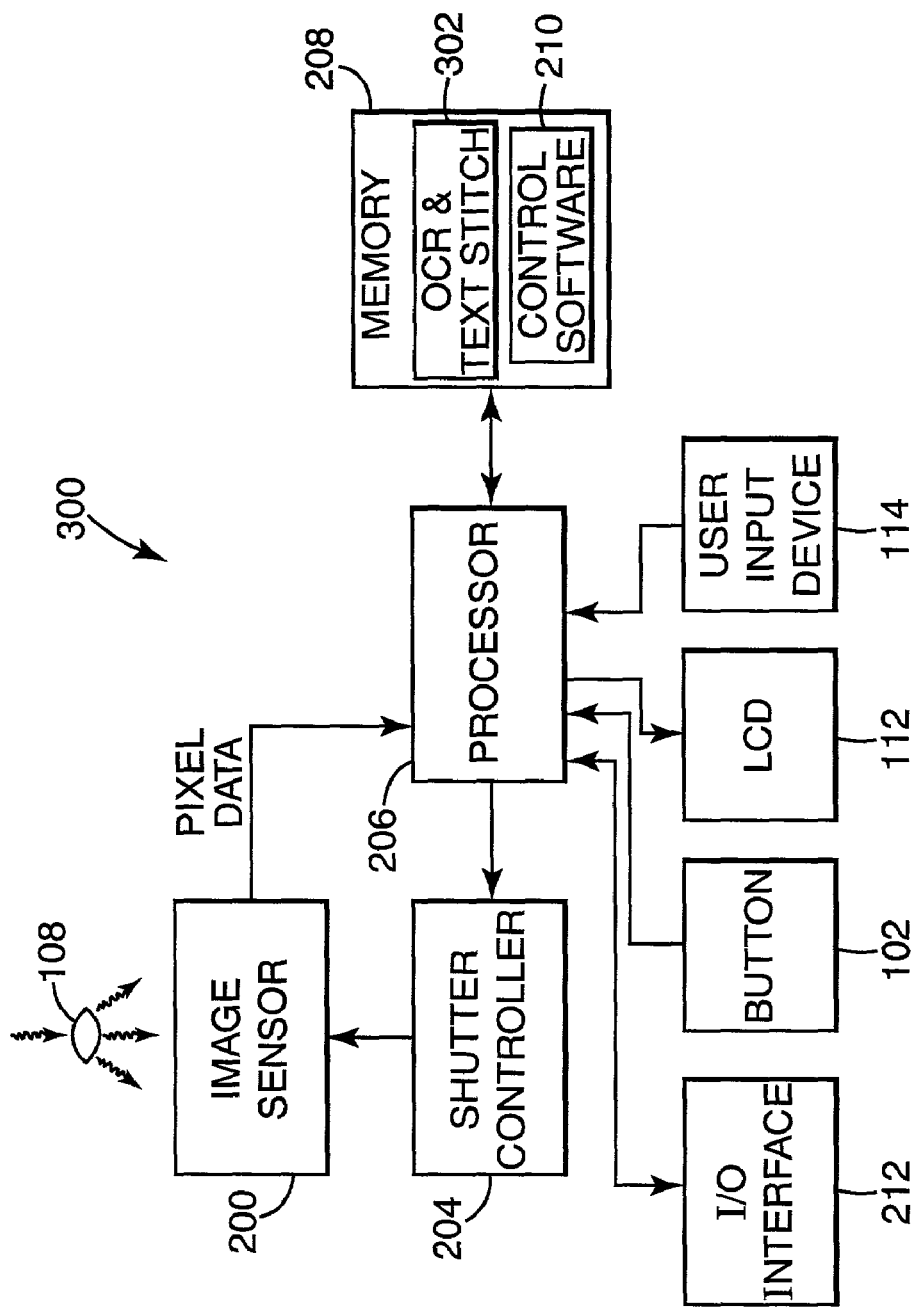
FIG. 3 is a block diagram illustrating major components of a digital camera configured to perform OCR and text stitching according to one embodiment of the present invention.

FIG. 3 is a block diagram illustrating major components of a digital camera 300 configured to perform OCR and text stitching according to one embodiment of the present invention. As shown in FIG. 3, digital camera 300 includes the same features as prior art digital camera 200, and also includes OCR and text stitch software 302 stored in memory 208. In one embodiment of the present invention, a plurality of partially overlapping images of a document are captured with camera 300, and OCR is performed on each image by software 302 to convert each image into a text file. Each text file includes a portion of the overall text in the original document. A "text stitch" algorithm is then performed by software 302 to combine the text files. One embodiment of a text stitch algorithm is discussed in further detail below with reference to FIG. 5.

Figure 4:
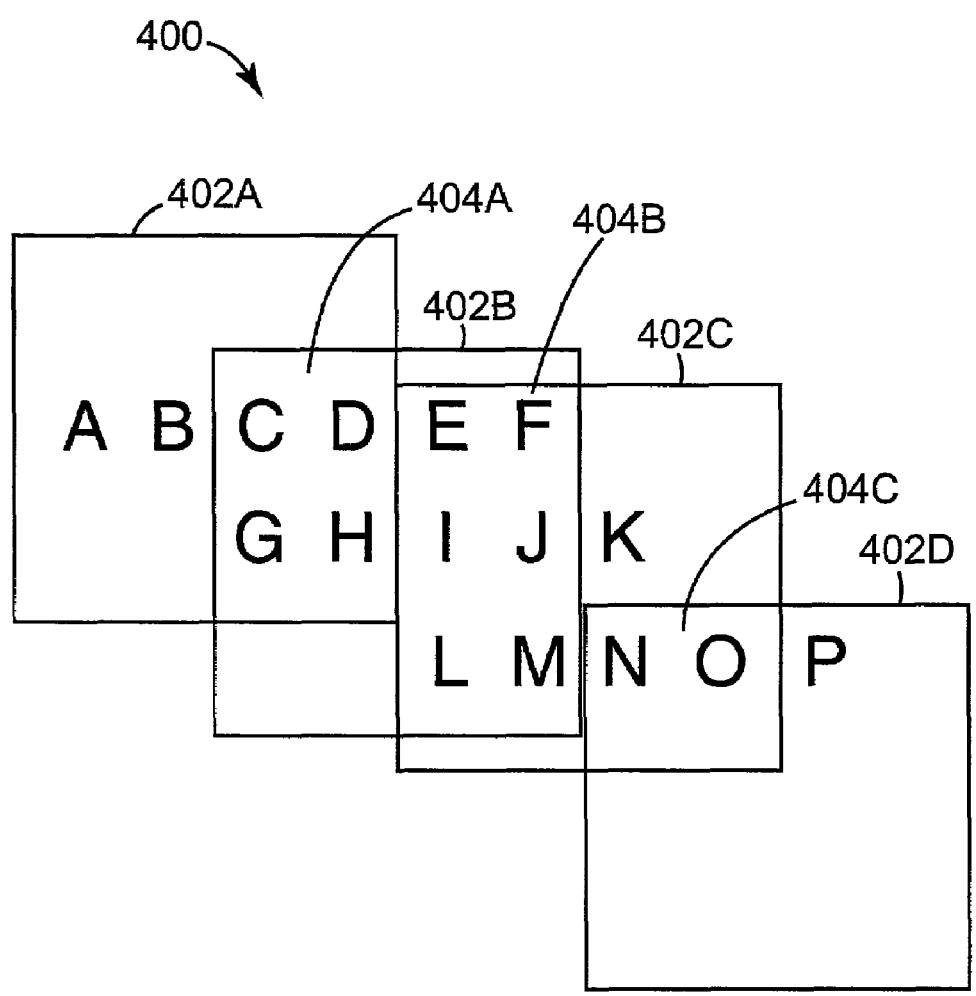
FIG. 4 is a diagram illustrating four overlapping image frames of text information.

FIG. 4 is a diagram illustrating four overlapping image frames 402A-402D of text information from a document 400 captured by camera 300. Three overlap regions 404A-404C are also shown in FIG. 4. Overlap region 404A represents the overlap between frames 402A and 402B. Overlap region 404B represents the overlap between frames 402B and 402C. And overlap region 404C represents the overlap between frames 402C and 402D. The processing of images 402A-402D by camera 300 is discussed in further detail below with reference to FIG. 5.

FIG. 5 is a flow diagram illustrating an OCR and text stitching algorithm 500 performed by camera 300 according to one embodiment of the present invention. In step 502, a plurality of partially overlapping images 402A-402D (shown in FIG. 4) of a document 400 are captured by camera 300. In one embodiment, camera 300 keeps track of the order in which each image is captured, and stores corresponding order information in memory 208. In step 504, camera 300 performs OCR on each of the captured images and generates a text file for each image. Techniques for performing OCR on digital images are known to those of ordinary skill in the art. After camera 300 performs OCR on each one of the individual frames 402A-402D, the text file for frame 402A includes the text "ABCD" and "GH." The text file for frame 402B includes the text "CDEF," "GHIJ," and "LM." The text file for frame 402C includes the text "EF," "IJK," and "LMNO." And the text file for frame 402D includes the text "NOP."

In steps 506 and 508, software 302 compares the text file for the first captured image 402A with the text file for the second captured image 402B, and identifies common characters and/or text strings between the two files. As shown by overlap region 404A in FIG. 4, images 402A and 402B (and their corresponding text files) include the characters "CD" and "GH" in common. In step 510, based on the identified common or overlapping text, camera 300 combines the text files for images 402A and 402B into a single text file. The combined text file includes all of the text from the text file for image 402A (i.e., "ABCD" and "GH"), plus all of the non-overlapping text of the text file for image 402B (i.e., "EF," "IJ" and "LM"). The text files for images 402A and 402B are combined by essentially superimposing the text file for image 402B on the text file for image 402A and aligning the common or overlapping text portions. After combining the text files for frames 402A and 402B, camera 300 has recreated the complete first line of text "ABCDEF" from the original document 400.

In step 512, camera 300 determines whether there are any more text files to be processed. If there are no more text files to be processed, the algorithm is done, as indicated at step 514. If there are more text files to be processed, as there are in this example, the algorithm jumps back to step 506. At steps 506 and 508, camera 300 compares the text file for image 402C to the combined text file for images 402A and 402B, and identifies common characters and/or text strings between the two files. As shown by overlap region 404B in FIG. 4, images 402B and 402B (and their corresponding text files) include the characters "EF," "IJ" and "LM" in common. In step 510, based on the identified common or overlapping text, camera 300 combines the text file for image 402C and the combined text file for images 402A and 402B into a single text file. The combined text file includes all of the text from the text files for images 402A-402C, with any redundancy from overlapping text portions being eliminated.

In step 512, camera 300 once again determines whether there are any more text files to be processed. Since there is one more text file in this example, the algorithm jumps back to step 506. At steps 506 and 508, camera 300 compares the text file for image 402D to the combined text file for images 402A-402C, and identifies common characters and/or text strings between the two files. As shown by overlap region 404C in FIG. 4, images 402C and 402D (and their corresponding text files) include the characters "NO" in common. In step 510, based on the identified common or overlapping text, camera 300 combines the text file for image 402D and the combined text file for images 402A-402C into a single text file. The combined text file includes all of the text from the text files for images 402A-402D, with any redundancy from overlapping text portions being eliminated. After combining the text files for all of the image frames 402A-402D, camera 300 has recreated the entire text from the original document 400.

Figure 6A:
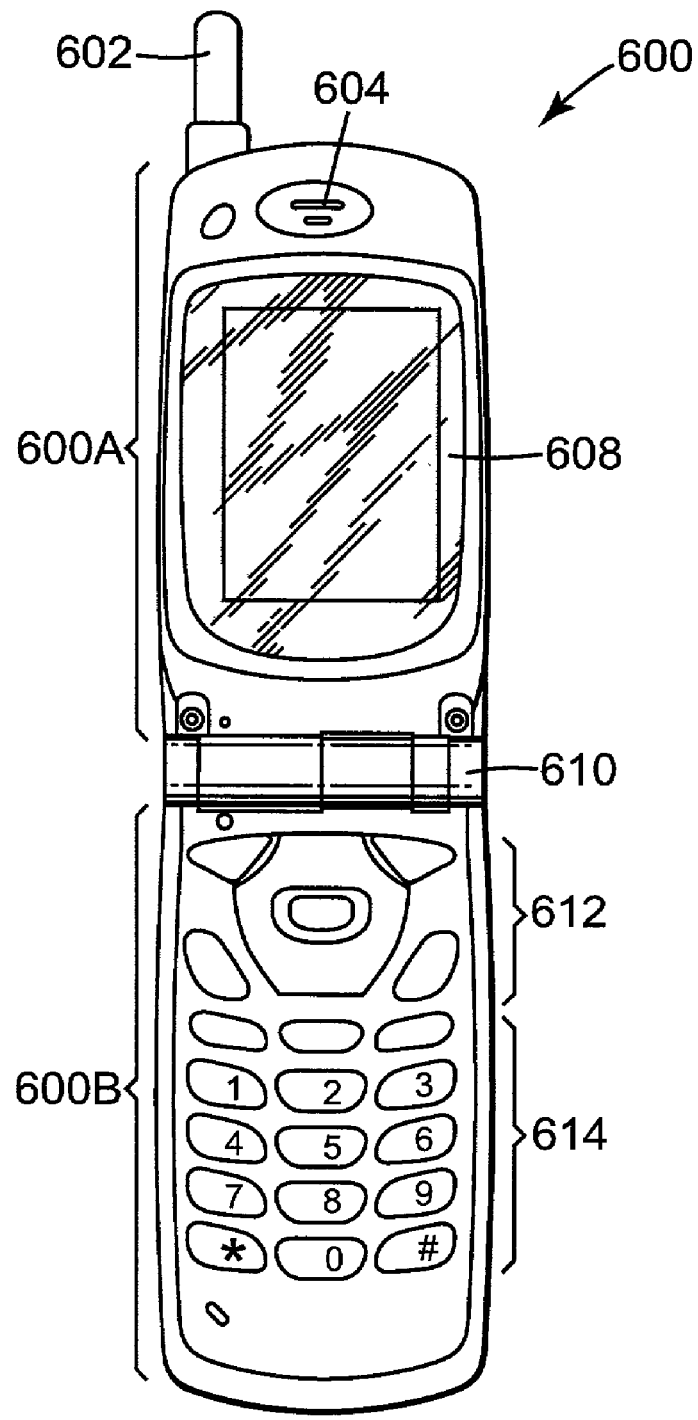
FIG. 6A is a diagram illustrating a front side of a combined cellular telephone and digital camera device configured to perform OCR and text stitching according to one embodiment of the present invention.
Figure 6B:
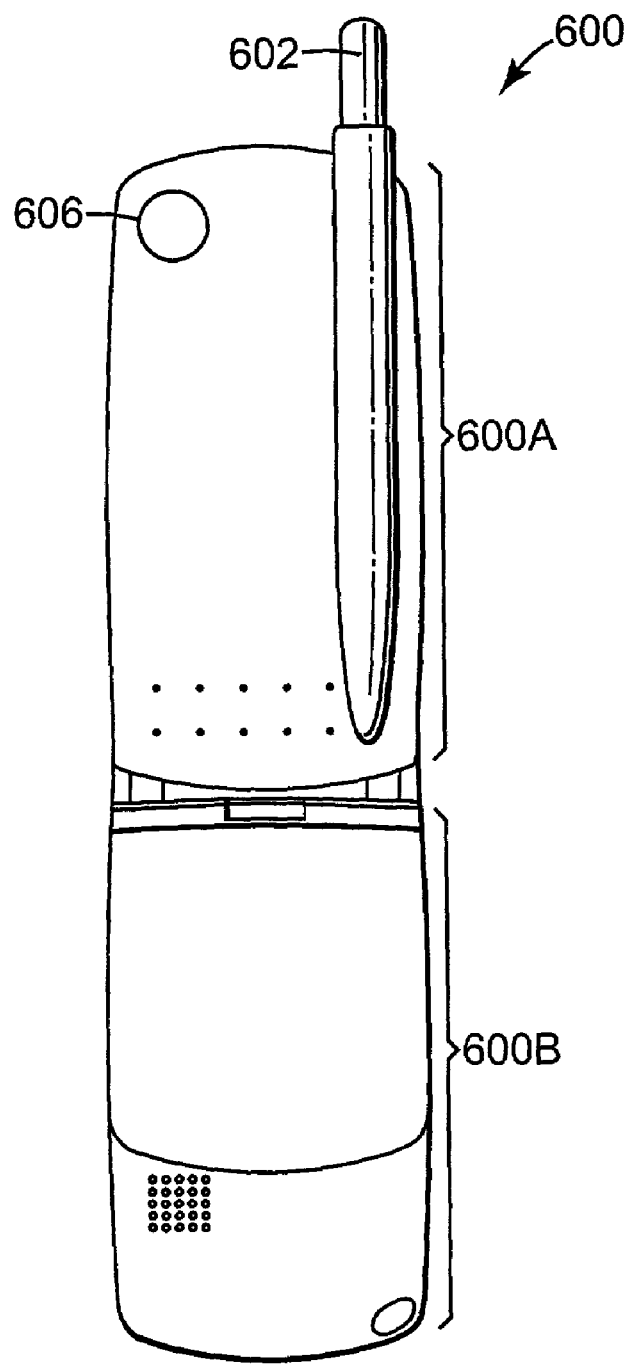
FIG. 6B is a diagram illustrating a back side of the combined cellular telephone and digital camera device shown in FIG. 6A.

FIG. 6A is a diagram illustrating a front side of a combined cellular telephone and digital camera device 600 configured to perform OCR and text stitching according to one embodiment of the present invention. FIG. 6B is a diagram illustrating a back side of the combined cellular telephone and digital camera device 600 shown in FIG. 6A. Device 600 includes upper portion 600A and lower portion 600B, which may be rotated about hinge 610 to go from an open position (as shown in FIG. 6A) to a closed position, as is common with many current cellular telephone models. Device 600 includes antenna 602, speaker 604, digital camera lens 606, LCD 608, navigation and control buttons 612, and numeric keypad 614. As will be understood by one of ordinary skill in the art, in addition to including lens 606, the digital camera of device 600 also includes conventional internal components, including an image sensor 200, shutter controller 204, processor 206, and memory 208 (shown in FIG. 3).

In addition to displaying information regarding cellular telephone operation, LCD 608 is also used as a viewfinder for the digital camera of device 600, and displays captured images. Although no optical viewfinder is shown for device 600, it will be understood by a person of ordinary skill in the art that device 600 could incorporate an optical viewfinder, as well as any other conventional features of currently available digital cameras.

Navigation and control buttons 612 and numeric keypad 614 are used to enter information, navigate through menus displayed on LCD 608 and select menu items, and control operation of device 600. Any one of buttons 612 or 614 may be designated as a shutter button 102 for capturing images with the digital camera of device 600, or a dedicated shutter button 102 can be provided.

In one embodiment, device 600 includes a processor 206 (shown in FIG. 3) and OCR and text stitch software 302 stored in a memory 208 (also shown in FIG. 3) to control operation of the device 600 and to perform OCR and text stitching functions as described above.

In an alternative embodiment of the present invention, rather than performing the OCR and text stitching functions within camera 300 or device 600, images are downloaded from camera 300 or device 600 to a computer or other electronic device, and the computer or other electronic device performs the OCR and text stitching functions described herein.

Although one embodiment of the present invention has been described in the context of a combined cellular telephone/digital camera device, it will be understood by a person of ordinary skill in the art that the techniques disclosed herein are applicable to any device that incorporates a digital camera, including but not limited to, a PDA and a laptop computer.

In addition to allowing a user to manually capture images for OCR and text stitching, in one embodiment, camera 300 and device 600 include a user-selectable automatic capture mode, wherein images are automatically captured at predefined intervals. In the automatic capture mode, the user need only scan the camera over the document to be imaged, and images are automatically captured at equally spaced time intervals.

In one form of the invention, to facilitate the stitching of text files together, a user may input direction information into camera 300 or device 600, which indicates to OCR and text stitch software 302 the direction that images are being captured (e.g., left to right, right to left, top to bottom, bottom to top). In an alternative embodiment, camera 300 and device 600 include a motion sensor for detecting the direction that the device is moving when capturing images, which is used by OCR and text stitching software 302 to facilitate stitching the text files together.

It will be understood by a person of ordinary skill in the art that functions performed by devices 300 and 600, including functions performed by OCR and text stitch software 302, may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of processing a document that includes a plurality of characters, the method comprising:
    capturing a plurality of partially overlapping digital images of the document with an image capture device;
    maintaining image sequence information identifying a sequential order in which the partially overlapping images were captured;
    receiving direction information indicative of a direction of relative movement between the image capture device and the document during the capture of the plurality of partially overlapping digital images;
    performing optical character recognition on the plurality of captured partially overlapping digital images to generate a corresponding plurality of electronic text files;
    selecting two of the plurality of electronic text files based on the sequence information; and
    combining the two selected electronic text files into a combined text file based on the direction information and based on a character sequence appearing in common in the two selected electronic text files.

2. The method of claim 1, wherein the plurality of partially overlapping digital images are captured with a digital camera, the method further comprising:
    providing the direction information with a user input device of the digital camera.

3. The method of claim 1, wherein the plurality of partially overlapping digital images are captured with a digital camera, the method further comprising:
    automatically detecting the direction information.

4. The method of claim 1, wherein the plurality of partially overlapping digital images are captured automatically at a predefined time interval.

5. A digital camera comprising:
    a memory adapted to store image sequence information representing an order in which a plurality of digital images are captured; and
    a controller configured to: receive direction information indicative of a direction of movement of the digital camera during capture of the plurality of digital images, perform optical character recognition on the plurality of digital images to generate electronic text files, and stitch at least two of the electronic text files together based on the image sequence information, the direction information, and by identifying overlapping text appearing in the at least two electronic text files.

6. The digital camera of claim 5, further comprising:
    a user input device for inputting the direction information.

7. The digital camera of claim 5, further comprising:
    a motion detector for automatically detecting the direction information.

8. The digital camera of claim 5, wherein the controller is configured to capture the plurality of digital images automatically at a predefined time interval.

9. An image capturing apparatus comprising:
    a memory for storing image sequence information representing an order in which images are captured by the image capturing apparatus; and
    a processor configured to perform optical character recognition on the images, generate electronic text files corresponding to the images, and to stitch the electronic text files together based at least in part on the image sequence information, on direction information indicative of a direction of relative movement of the image capturing apparatus, and on character sequence information.

10. The image capturing apparatus of claim 9, wherein the image capturing apparatus is implemented in one of a cellular telephone, a personal digital assistant device, and a laptop computer.

11. The image capturing apparatus of claim 9, further comprising an input device to allow a user to enter the direction information.

12. The image capturing apparatus of claim 9, further comprising
   a motion detector to automatically detect the direction information.

13. The image capturing apparatus of claim 9, wherein the processor is configured to cause the images to be captured automatically at a predefined time interval.

* * * * *